United States Patent [19]

Mortensen et al.

[11] Patent Number: 4,542,457
[45] Date of Patent: Sep. 17, 1985

[54] BURST MODE DATA BLOCK TRANSFER SYSTEM

[75] Inventors: David J. Mortensen, Mission Viejo; Jayesh V. Sheth, El Toro, both of Calif.

[73] Assignee: Burroughs Corporation, Detroit, Mich.

[21] Appl. No.: 457,178

[22] Filed: Jan. 11, 1983

[51] Int. Cl.[4] .............................................. G06F 9/00
[52] U.S. Cl. .................................................. 364/200
[58] Field of Search ...................... 364/200, 900, 300

[56] References Cited

U.S. PATENT DOCUMENTS

| 4,040,026 | 8/1977 | Gernelle | 364/200 |
|---|---|---|---|
| 4,040,037 | 8/1977 | Lawlor | 364/200 |
| 4,162,520 | 7/1979 | Cook et al. | 364/200 |
| 4,228,501 | 10/1980 | Frissell | 364/200 |
| 4,293,928 | 10/1981 | Baun | 364/900 |
| 4,371,932 | 2/1983 | Dinwiddie, Jr. | 364/200 |
| 4,393,445 | 7/1983 | Milligan et al. | 364/200 |
| 4,413,319 | 11/1983 | Schultz et al. | 364/200 |
| 4,420,819 | 12/1983 | Price et al. | 364/900 |
| 4,445,176 | 4/1984 | Burke et al. | 364/200 |

Primary Examiner—Gareth D. Shaw
Assistant Examiner—John G. Mills
Attorney, Agent, or Firm—Alfred W. Kozak; Nathan Cass; Kevin R. Peterson

[57] ABSTRACT

A data transfer system whereby a peripheral-controller manages data transfers between the host computer and a magnetic tape peripheral unit. Data undergoing transit, is temporarily stored in a buffer memory of the peripheral-controller and is monitored by a block counter monitoring system which informs a program-sequencer in the common control circuit unit of the peripheral-controller when data may be shifted into or out of the buffer memory in order to avoid or reduce the probability of access error conditions.

8 Claims, 6 Drawing Figures

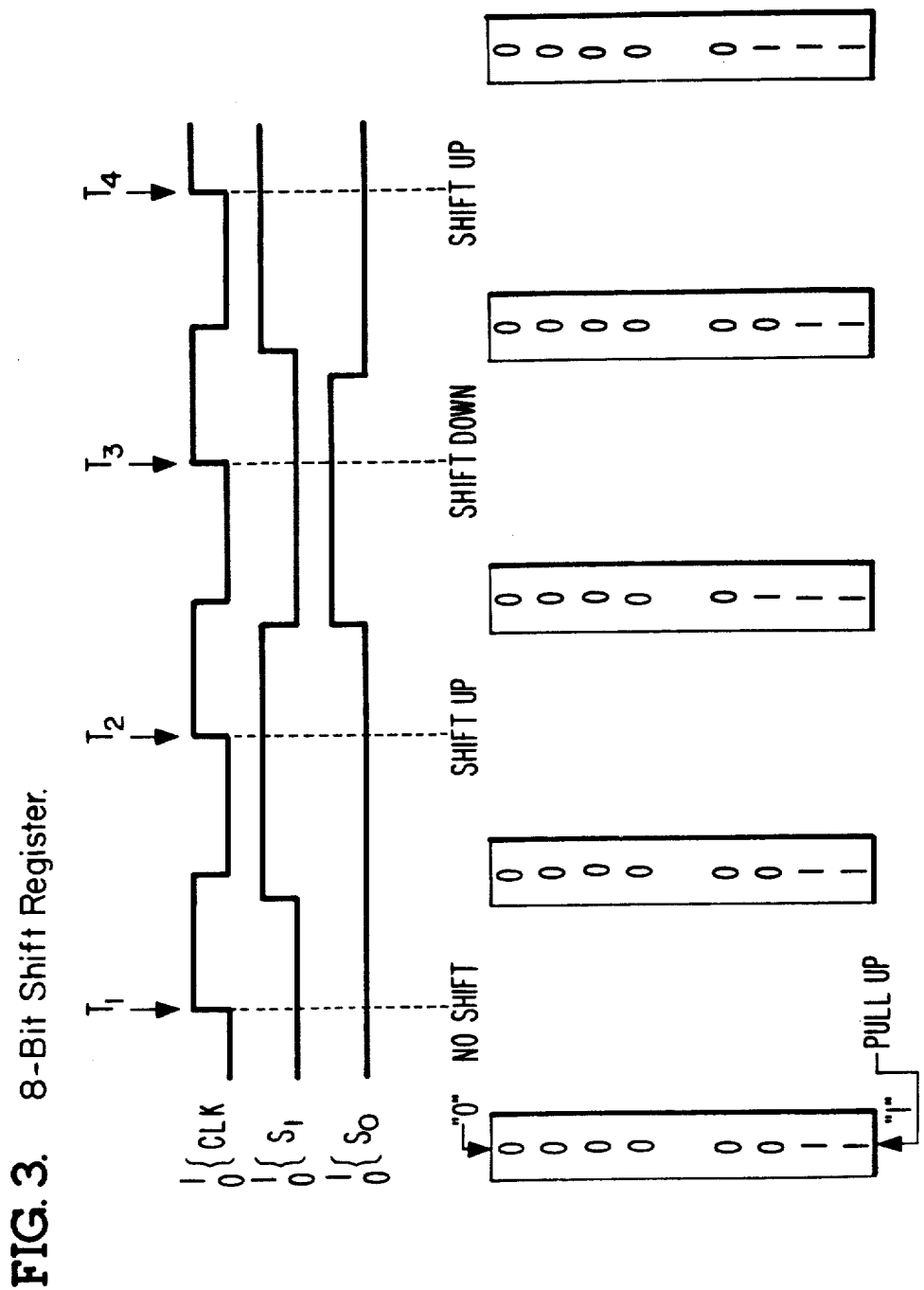
FIG. 3. 8-Bit Shift Register.

FIG.4.

| $S_{CARRY}$ | $P_{CARRY}$ | READ | WRITE |
|---|---|---|---|
| 0 | 0 | NO SHIFT | NO SHIFT |
| 0 | 1 | UP | DOWN |
| 1 | 0 | DOWN | UP |
| 1 | 1 | NO CHANGE | NO CHANGE |

$S_1 = 1$ UP $\phantom{ENABLE}$ (READ $* \overline{S_{CARRY}} * P_{CARRY}) +$
$S = 0$ ENABLE $=$ (WRITE $* S_{CARRY} * \overline{P_{CARRY}})$ $S_1 = 1$ DOWN $\phantom{ENABLE}$ (READ $* S_{CARRY} * \overline{P_{CARRY}}) +$
$S_O = 0$ ENABLE $=$ (WRITE $* \overline{S_{CARRY}} * P_{CARRY})$ $S_1 = 0$ $\phantom{NO CHANGE=}$ for(READ $* S_{CARRY} * P_{CARRY})$
$S_O = 0$ NO CHANGE $=$ $+$(WRITE $* S_{CARRY} * P_{CARRY})$ F/F → HOST ACCESS ERROR OR BLOCK COUNTER ERROR $=$ (READ $* \overline{6 BLKFUL}) +$ (WRITE $* \overline{1 BLKFUL}$)

F/F

NOTE: $+ =$ OR
$\phantom{NOTE:} * =$ AND

BLOCK COUNTER

|  | READ | WRITE |
|---|---|---|
| SCRY ⇒ SCR8 | SHIFT DOWN | SHIFT UP |
| PCRY ⇒ PCR8 | SHIFT UP | SHIFT DOWN |
| SCRY ⇒ SCR8 PCRY ⇒ PCR8 IN THE SAME CLOCK CYCLE | $S_I \cdot S_O = 1$ NO SHIFT | $S_I \cdot S_O = 1$ NO SHIFT |
| INITIALLY | CLEARED | CLEARED |
| HOST ACCESS ERROR CONDITION WILL BE SET | WHEN 6BLKFUL BECOMES "1" | AFTER GETTING 6 BLOCKS FROM HOST WHEN 1 BLKFUL BECOMES "0" |

4,542,457

BURST MODE DATA BLOCK TRANSFER SYSTEM

FIELD OF THE INVENTION

This invention is related to systems where data transfers are effectuated between a peripheral terminal unit and a main host computer wherein an intermediate I/O subsystem is used to perform the housekeeping duties of the data transfer.

BACKGROUND OF THE INVENTION

A continuing area of developing technology involves the transfer of data between a main host computer system and one or more peripheral terminal units. To this end, there has been developed I/O subsystems which are used to relieve the monitoring and housekeeping problems of the main host computer and to assume the burden of controlling a peripheral terminal unit and to monitor control of data transfer operations which occur between the peripheral terminal unit and the main host computer system.

A particular embodiment of such an I/O subsystem has been developed which uses peripheral controllers known as data link processors whereby initiating commands from the main host computer are forwarded to a peripheral-controller which manages the data transfer operations with one or more peripheral units. In these systems the main host computer also provides a "data link word" which identifies each task that has been initiated for the peripheral-controller. After the completion of a task, the peripheral-controller will notify the main host system with a result/descriptor word as to the completion, incompletion or problem involved in the particular task.

These types of peripheral-controllers have been described in a number of patents issued to the assignee of the present disclosure and these patents are included herein by reference as follows:

U.S. Pat. No. 4,106,092 issued Aug. 8, 1978, entitled "Interface System Providing Interfaces to Central Processing Unit and Modular Processor-Controllers for an Input-Output Subsystem", inventor D. A. Millers, II.

U.S. Pat. No. 4,074,352 issued Feb. 14, 1978, entitled "Modular Block Unit for Input-Output Subsystem", inventors D. J. Cook and D. A. Millers, II.

U.S. Pat. No. 4,162,520 issued July 24, 1979, entitled "Intelligent Input-Output Interface Control Unit for Input-Output Subsystem", inventors D. J. Cook and D. A. Millers, II.

U.S. Pat. No. 4,189,769 issued Feb. 19, 1980, entitled "Input-Output Subsystem For Digital Data Processing System", inventors D. J. Cook and D. A. Millers, II.

U.S. Pat. No. 4,280,193 issued July 21, 1981, entitled "Data Link Processor for Magnetic Tape Data Transfer System", inventors K. W. Baun and J. G. Saunders.

U.S. Pat. No. 4,313,162 issued Jan. 26, 1982, entitled "I/O Subsystem Using Data Link Processors", inventors K. W. Baun and D. A. Millers, II.

U.S. Pat. No. 4,322,792 issued Mar. 30, 1982, entitled "Common Front-End Control for a Peripheral Controller Connected to a Computer", inventor K. W. Baun.

The above patents, which are included herein by reference, provide a background understanding of the use of the type of peripheral-controllers known as "data link processors", DLP, used in a data transfer network between a main host computer and peripheral terminal unit.

In the above mentioned Baun patent, there was described a peripheral-controller which was built of modular components consisting of a common front end control circuit which was of a universal nature for all types of peripheral controllers and which was connected with a peripheral dependent board circuit. The peripheral dependent circuit was particularized to handle the idiosyncrasies of specific peripheral terminal units.

The present disclosure likewise uses a peripheral-controller (data link processor) which follows the general pattern of the above described system, in that the peripheral-controller uses a common control circuit or common front end which works in coordination with a peripheral dependent circuit which is particularly suited to handle a specific type of peripheral terminal unit, such as a Tape Control Unit (TCU) which connects to one or more magnetic tape units.

SUMMARY OF THE INVENTION

The present invention involves a data transfer network wherein a peripheral-controller known as a data link processor is used to manage and control data transfer operations between a peripheral such as a magnetic tape unit (or a tape control unit) and the main host computer system, whereby data is transferred rapidly in large blocks, such as a block of 256 words.

The data link processor provides a RAM buffer memory means for temporary storage of data being transferred between peripheral and host system. In this case, the RAM buffer is capable of holding at least six blocks or units of data, each of which consists of 256 words, each word being of 16 bits.

In order to facilitate and control those activities in which (a) data is sometimes being "shifted into" the RAM buffer memory means from either the peripheral unit or from the main host computer and (b) the data in the RAM buffer memory is being "shifted out" either to the magnetic tape unit peripherals, for example, or to the main host computer, it is necessary that the peripheral-controller and the system have data which informs it of the condition of the RAM buffer memory means with regard to the amount of data residing therein at any given period of time.

Thus, there is disclosed a system for regulating data transfer operations between host and peripheral whereby a peripheral-controller senses blocks of data stored in its RAM buffer in order to choose routines for data transfer appropriate to the data condition of the RAM buffer. The peripheral-controller makes use of a block counter monitoring system which will inform the peripheral-controller and the main host system of the "numerical block status" of data in the RAM buffer memory means.

In particular, the present invention discloses a system whereby one phase of the data transfer operations, i.e. transfers between the RAM buffer (in the peripheral-controller) and the main host system, are managed by a "burst-mode" operation whereby transfers between host and RAM buffer are accomplished in rapid transfers of full blocks (256 words) of data.

The system utilizes a block counter to monitor the status of the amount of data residing in the RAM buffer. If two or more blocks of data reside in the buffer, then (on a "Read" operation) the system will transfer data (in bursts of one full block) from buffer to host. A burst counter is used to count the number of words transferred.

Likewise on a "Write" operation, if the RAM buffer has at least two empty block storage areas, the system can use burst transfer to move a full block of data from host to buffer in one continuous transfer.

BRIEF DESCRIPTION OF THE DRAWINGS

FIG. 3 is a drawing showing an eight bit shift register which can be shifted up or down according to conditions which occur between certain logic signals and clock signals.

FIG. 4 is a diagram showing how the block counter logic unit of FIG. 1 is organized to operate during Read or Write operations and the effect of either shifting up or shifting down the shift register.

A "Read" operation takes data from a peripheral magnetic tape unit and temporarily stores it in a RAM memory buffer for later transfer to the host system.

A "Write" operation takes data from the main host system for temporary storage in the RAM buffer memory for subsequent transfer to a selected magnetic tape unit via a TCU or Tape Control Unit.

GENERAL SYSTEM OPERATION

Figure 2:
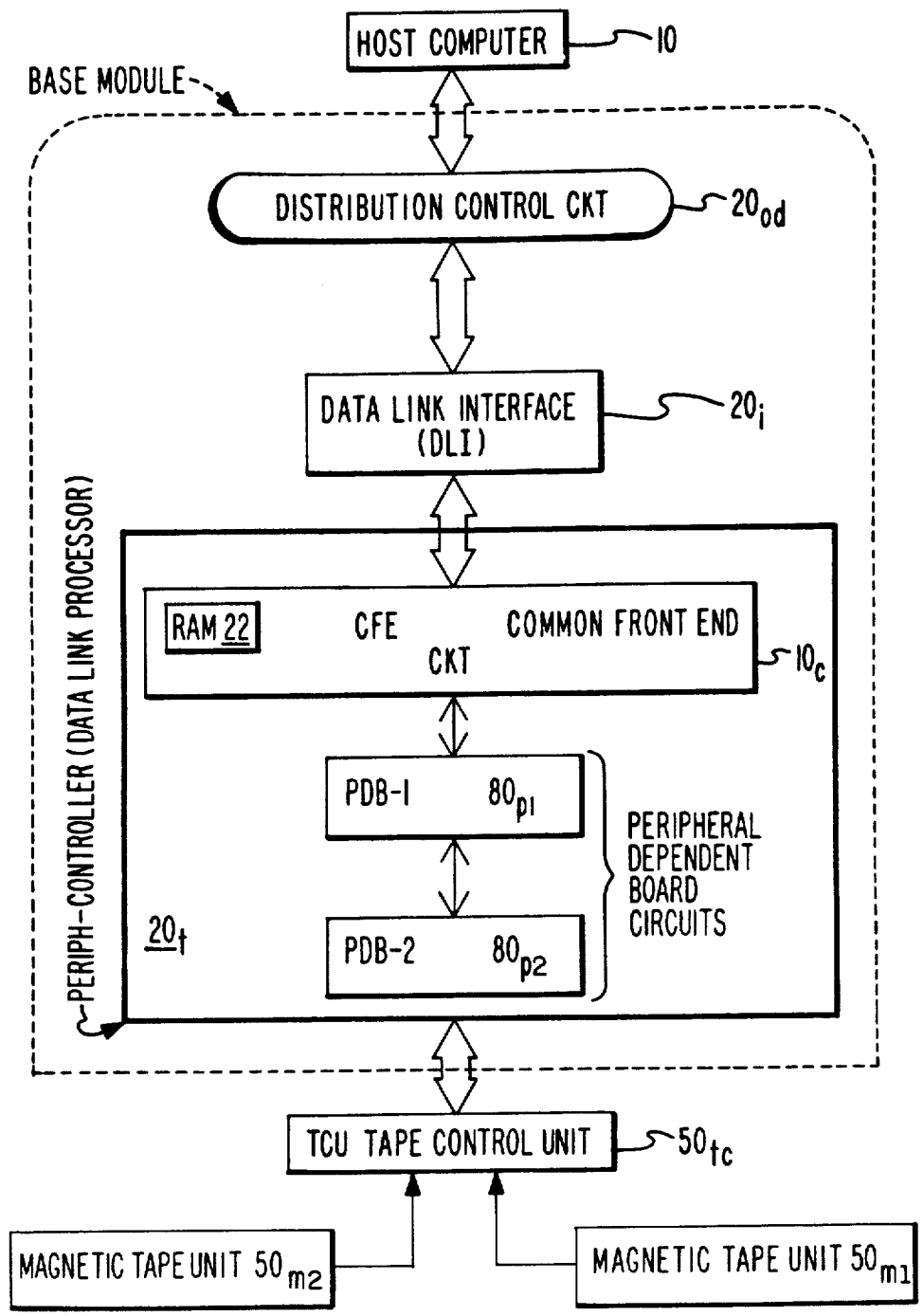
FIG. 2 is a system diagram showing the host computer cooperating with a peripheral-controller in order to control data transfer to and from a peripheral unit.

To initiate an operation, the host system 10, FIG. 2, sends the peripheral-controller (data link processor $20_t$) an I/O descriptor and also descriptor link words. The I/O descriptor specifies the operation to be performed. The descriptor link contains path selection information and identifies the task to be performed, so that when a report is later sent back to the main host system 10, the main host system will be able to recognize what task was involved. After receipt of the I/O descriptor link, the data link processor (DLP) makes a transition to one of the following message level interface states:

(a) Result Descriptor: this state transition indicates that the data link processor $20_t$ is returning a result descriptor immediately without disconnection from the host computer 10. For example, this transition is used when the DLP detects an error in the I/O descriptor.

(b) DISCONNECT: This state transition indicates that the Magnetic Tape-Data Link Processor (MT-DLP) cannot accept any more operations at this time and that the I/O descriptor and the descriptor link were received without errors. This state also indicates that data transfers or result descriptor transfers can occur.

(c) IDLE: this state transition indicates that the DLP $20_t$ can accept another legal I/O operation immediately and that the I/O descriptor and the descriptor link were received without errors.

When the operation is completed, the DLP $20_t$ returns a result descriptor indicating the status of the operation in the main host system. If the DLP detects a parity error on the I/O descriptor or the descriptor link, or if the DLP cannot recognize the I/O descriptor it received, then the DLP cannot proceed with execution of the operation. In this case, the DLP returns a one-word result descriptor to the host. In all other cases the DLP returns a two-word result descriptor.

The data link processor $20_t$ is a multiple-descriptor data link processor capable of queuing one I/O descriptor for each magnetic tape unit to which it is connected. There are certain descriptors (Test/Cancel; Test/Discontinue; and Test/ID) which are not queued, but which can be accepted at any time by the DLP. Test/Cancel and Test/Discontinue OPs are issued against a single magnetic tape unit in a queue dedicated to that peripheral unit, and require that an I/O descriptor for that particular magnetic tape unit already be present within the DLP. If an I/O descriptor is received and violates this rule, the DLP immediately returns a result descriptor to the host. This result descriptor indicates "descriptor error" and "incorrect state".

As previously discussed in the referenced patents, the MT-DLP utilizes the following status states (STC) transitions when "disconnected" from the host:

STC=3 to STC=1
  IDLE to DISCONNECT
indicates that the DLP is attempting to process a queued OP.

STC=1 to STC=3
  DISCONNECT to IDLE
indicates that the DLP is prepared to accept a new I/O descriptor.

STC=3 to STC=5
  IDLE to SEND DESCRIPTOR LINK
indicates that the DLP is executing an OP, and that the DLP requires access to the host computer.

STC=1 to STC=5
  DISCONNECT to SEND DESCRIPTOR LINK
indicates that the DLP is executing an OP, and that the DLP requires access to the host computer.

The DLP status states can be represented in a shorthand notation such as STC=n.

Upon completion of an I/O operation, the data link processor forms and sends the result descriptor to the host system. This descriptor contains information sent by the tape control unit $50_{tc}$ to the DLP in the result status word, and also information generated within the DLP. The result descriptor describes the results of the attempt to execute the operation desired.

DESCRIPTOR MANAGEMENT

All communications between the DLP $20_t$ and the host system 10 are controlled by standard DLP status states as described in the previously referenced patents. These status states enable information to be transferred in an orderly manner. When a host computer 10 connects to the DLP $20_t$, the DLP can be in one of two distinct states: (a) ready to receive a new descriptor, or (b) busy.

When in STC=3 (IDLE), the DLP can accept a new I/O descriptor. When in STC=1 (DISCONNECT) or in STC=5 (SEND DESCRIPTOR LINK), then the DLP is busy performing a previously transferred operation.

When the DLP receives an I/O descriptor and descriptor link that does not require immediate attention, the DLP stores the descriptor in its descriptor queue. The DLP is then able to receive another I/O descriptor from the host system.

When the host system 10 "Disconnects" from the DLP $20_t$ after issuing one or more queued I/O descriptors, then the DLP initiates a search of its descriptor queue. This search continues until the DLP finds an I/O descriptor that needs DLP attention, or until the host "reconnects" to send additional I/O descriptors. If the DLP finds an I/O descriptor that requires attention, and if the descriptor specifies neither a Test/Wait for Unit Available OP, nor a Test/Wait for Unit Not Available OP, then the DLP verifies that the host is still "disconnected". If these conditions are met, the DLP goes to STC=1 (DISCONNECT) and initiates execution of the descriptor. Once the DLP goes to STC=1, then no further I/O descriptors are accepted from the host until the initiated operation has been completed and a result descriptor has been returned to the host.

The DLP searches its descriptor queue on a rotational basis. The order for search is not disturbed by the receipt of one or more new I/O descriptors, nor by the execution of operations. This means that all queued entries are taken in turn regardless of DLP activity and all units have equal priority.

When cleared, the DLP halts all operations in progress with the peripherals and invalidates all the queued I/O descriptors, and returns to Status STC=3 (IDLE).

DLP-DATA BUFFERS AND DATA TRANSMISSION

The data buffer 22 (FIG. 1) of the DLP provides storage for six blocks of data which are used in a "cyclic" manner. Each of the six blocks holds a maximum of 512 bytes of data. Data is transferred to or transferred from the host system one block at a time, via the buffer 22, followed by a longitudinal parity word (LPW). Data is always transferred in full blocks (512 bytes) except for the final block of data for a particular operation. This last block can be less than the 512 bytes, as may be required by the particular operation.

Figure 1:
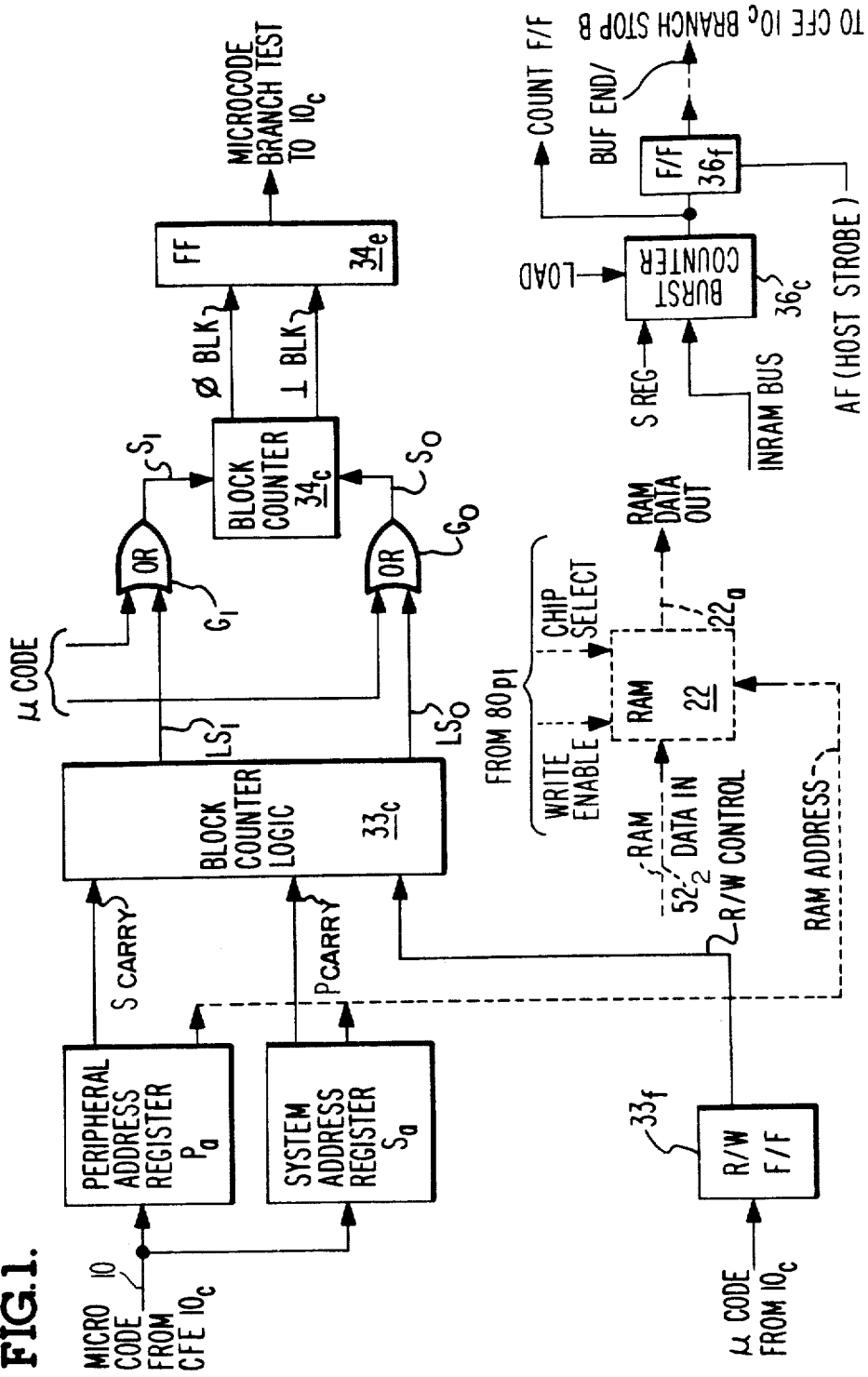
FIG. 1 illustrates the block counter and burst counter system of the present disclosure which is used to inform the data transfer system of the status of a buffer memory means.

As seen in FIG. 1, logic circuitry (to be described hereinafter) is used to feed information to a block counter $34_c$ which will register the number of blocks of data residing in buffer 22 at any given moment. When certain conditions occur, such as a full buffer, or empty buffer, or "n" number of blocks, the counter $34_c$ can set to trigger a flip-flop $34_e$ which will signal the common control circuit unit $10_c$ to start routines necessary to either transfer data to the host 10 (after reconnecting to the host) or to get data from the host 10 to transfer to the buffer 22; or else the unit $10_c$ can arrange to connect the DLP $20_t$ to the peripheral (as tape control unit $50_{tc}$) for receipt of data or for transmission of data.

During a Write operation, the block counter $34_c$ counts the number of blocks of data received from the host system 10. The data link processor "disconnects" from the host system once the DLP has received six buffers; or it will disconnect upon receipt of the "Terminate" command from the host system (a Terminate indicates the "end" of the Write data for that entire I/O operation). After disconnecting from the host, the data link processor connects to the peripheral tape control unit (TCU $50_{tc}$). Once proper connection is established between the data link processor and the tape subsystem, the data link processor activates logic which allows the tape control unit $50_{tc}$ a direct access to the DLP RAM buffer 22 for use in data transfers.

After the data link processor has transmitted one block of data to the tape control unit, the data link processor attempts to "reconnect" to the host system by means of a "poll request" (as long as the host 10 has not "terminated" the operation). Once this reconnection is established, the host transfers additional data to the data link processor. This transfer continues until either the six blocks of RAM buffer memory 22 are again full (a buffer which is in the process of being transferred to the tape control unit is considered full during this procedure), or until the host 10 sends a "Terminate" command. Data transfer operations between the data link processor $20_t$ and the tape control unit $50_{tc}$ continue simultaneously with the host data transfers occurring between host 10 and DLP $20_t$ (via the buffer 22).

If the data link processor has not successfully reconnected to the host before the DLP has transmitted, for example, three blocks of data to the tape control unit $50_{tc}$, the data link processor sets "emergency request" on the data link interface $20_i$, FIG. 1. If the "emergency request" is not successfully serviced before the DLP has only one block of data remaining for transmission to the tape control unit, the data link processor sets a "Block Error" condition by signal from flip-flop $34_e$ to circuit $10_c$. This is reported to the host system as a "host access error" in the result descriptor.

The last block of data for any given I/O operation is transferred to the tape control unit $50_{tc}$ directly under micro-code control. During a "Read" operation, the data link processor first attempts to connect to the tape control unit $50_{tc}$. Once a successful connection is accomplished, the data link processor initiates logic to begin accepting data from the tape subsystem. Once the data link processor has received two blocks of data (or once the DLP receives all the data from the operation if the total length is less than two blocks), the data link processor attempts to connect to the host using a "poll request". The data link processor continues to accept tape data while at the same time affecting this host connection.

If the host does not respond to the "poll request" before four blocks of data are present in the DLP RAM buffer 22, the data link processor sets "emergency request" on the data link interface $20_i$. If no connection to the host system is effectuated before all of the six RAM buffers are filled, then the data link processor sets "host access error" in the result descriptor.

Once the host system answers a "poll request", the data link processor $20_t$ starts to send data to the host system 10 while at the same time continuing to receive data from the tape control unit $50_{tc}$. After the host 10, FIG. 2, has received one block of data, the data link processor checks whether or not two full blocks of data remain to be transferred to the host. If this is so, the DLP uses a "break enable". If a "break enable" request is granted, then transmission of the next data buffer to the host continues to occur. If there are less than two full blocks of data in the RAM buffer 22 (or if the "break enable" is refused), the data link processor disconnects from the host and waits for two full blocks of data to be present. If a "break enable" is refused, the data link processor initiates another "poll request" immediately after disconnection.

When the data link processor has completed data transfer, the tape control unit $50_{tc}$ enters the result phase and sends two words of result status to the data link processor $20_t$. The DLP then incorporates this information, plus any internal result flags, into the result descriptor which the DLP then sends to the host.

DESCRIPTION OF PREFERRED EMBODIMENTS

Referring to FIG. 2, the overall system diagram is shown whereby a host computer 10 is connected through an I/O subsystem to a peripheral unit, here, for illustrative purposes, shown as a tape control unit $50_{tc}$. This tape control unit (TCU) is used to manage connection to a plurality of Magnetic Tape Unit (MTU) peripherals. As per previous descriptions in the above cited patents which were included by reference, the I/O subsystem may consist of a base module which supports one or more peripheral-controllers, in addition to other connection and distribution circuitry such as the distribution control circuit $20_{od}$ and the data link interface $20_i$. The peripheral-controller $20_t$ is shown in modular form as being composed of a common front end circuit $10_c$ and a peripheral dependent circuit shown, in this case, as being composed of two peripheral dependent boards designated $80_{p1}$ and $80_{p2}$.

In this network situation, it is often desired that data from the main host computer be transferred on to a peripheral unit, such as a magnetic tape unit, for recording on tape. This would be done via a peripheral tape control unit TCU such as $50_{tc}$. Likewise, at times it is desired that data from the magnetic tape unit be passed through the tape control unit to be read out by the host computer. Thus, data is transferred in a bidirectional sense, that is, in two directions at various times in the activities of the network.

The key monitoring and control unit is the data link processor $20_t$ which when initiated by specific commands of the host computer will arrange for the transfer of the desired data in the desired direction.

As seen in FIG. 1, the RAM buffer 22 is used for temporary storage of data being transferred between peripherals and the main host computer. In the preferred embodiment this RAM buffer has the capability of storing at least six "blocks" of data, each block of which consists of 256 words.

Again referring to FIG. 1, a block counter logic unit $33_c$ is used to receive input from two address registers designated as the peripheral address register, $P_a$, and the system address register, $S_a$. The peripheral address register, $P_a$, handles addresses required when data is retrieved from the peripheral tape unit or when data is being sent to the peripheral tape unit. The system address register, $S_a$, is used when data is being received from the host system into the buffer 22 and when data is being sent to the host system from the buffer 22. These two address registers in FIG. 1 are seen to receive their address data via microcode signals from the common front end circuit $10_c$ of FIG. 1.

The address data outputs from $P_a$ and $S_a$ are fed to the RAM buffer 22 in order to address the desired location in the buffer memory. Further, the block counter logic unit $33_c$ receives one input designated "P Carry" from the peripheral address register and another input "S Carry" from the system address register, in addition to a Read/Write control signal from read-write flip-flop $33_f$. The flip-flop $33_f$ is controlled by microcode signals from the peripheral-controller common front end unit $10_c$. The block counter logic unit $33_c$ provides a first logic signal $LS_1$ and a second logic signal $LS_0$ which are fed to OR gates $G_1$ and $G_0$. These gates also have additional inputs from the microcode of the common front end card $10_c$ which inputs can be used to simulate the $LS_1$ and $LS_0$ signals for diagnostic or other control purposes. The OR gates provide two output signals designated $S_1$ and $S_0$ which are fed to the block counter $34_c$. As will be seen in FIG. 3, the output signals $S_1$ and $S_0$ are combined at certain times on occurrence of rising clock signals in order to provide conditions which will make the block counter either "shift up" or "shift down" or "no shift".

Referring to FIG. 3, there is seen a schematic drawing which illustrates the use of the block counter $34_c$ of FIG. 1.

Referring to FIG. 3, there is seen, schematically, an eight bit shift register which will be affected at selected points in time where the clock signal is in its "rising" state as illustrated by the arrows shown in FIG. 3. Referring to the leftmost schematic of the shift register, it will be seen that there are two "ones" which illustrate that the RAM buffer 22 has been loaded with two full blocks of data. At time $T_1$ it will be seen that conditions are such that "no shift" has occurred and the two "ones" remain in the shift register. At time $T_2$ there is a "shift up" and the shift register now has three bits with the "1" signal. At time $T_3$ there is a "shift down" signal and the shift register is back where two bit positions include a "1". At time $T_4$ there is a "shift up" and the shift register now has three bit positions manifesting the "1" signal, which indicates three full blocks of data residing in buffer 22 at that moment.

Referring to FIG. 4, there is seen a chart whereby the block counter logic unit $33_c$ is organized to show overall operating conditions. Thus, as seen in the FIG. 4 chart, the conditions of the S Carry and P Carry during the "Read" condition show that there is a no shift or no change when S Carry and P Carry are the same, that is to say they are both 0 or they are both 1.

However, when S Carry is "0" and the P Carry is equal to "1", then there is an up shift, while if the S Carry is "1" and the P Carry is "0", there is a down shift during "Read" operations.

Referring to FIG. 4, it is seen that during "Write" operations, again when the S Carry and the P Carry are equal (both "0" or both "1") to each other, then there is no change or shift in the shift register. However, when the S Carry equals "0" and the P Carry equals "1" there is a down shift in this situation, and when the S Carry is equal to "1" and the P Carry is equal to "0" there is an up shift.

The block counter $34_c$ will reflect the situation that when data is being taken out of the magnetic tape unit in order to be fed to RAM buffer 22 ("Read" operation), the block counter will shift up unless at the same time there is data being removed from buffer 22 for transfer to the main host computer system in which case the block counter will shift down. Thus, the condition of the block counter's numerical status will indicate the "balance" between what data has gone out of and what data has come into the buffer 22.

Referring to FIG. 4, if there is a "Write" operation, this determines that data is to be written into the magnetic tape unit. Then, as data is removed from the RAM buffer over to the magnetic tape unit, the block counter will shift down but if more data is transferred from the main host computer into the RAM buffer 22, the block counter will be shifted up. Thus, again the placement of "ones" in various bit positions provides a running balance of the data blocks taken out as against the data blocks taken in at any given period.

Referring to FIG. 4 there are certain logic equations which indicate the logic used in the block counter logic unit $33_c$.

In the following logic equations it should be indicated that the asterisk refers to AND logic operation while the plus sign refers to OR logic operation.

(a) If signal counter $S_1$ equals "1" and signal $S_0$ equals "0", there occurs what may be called a condition of "Up enable" which is equal to (Read * S Carry * P Carry)+(Write * S Carry * P Carry).

(b) Under the conditions where the signal $S_1$ equals "0" and the signal $S_0$ equals "1", this could be considered as a "Down enable" which is equal to (Read * S Carry * P Carry)+(Write * S Carry * P Carry).

(c) In the condition where the signal $S_1$ equals "0" and the signal $S_0$ equals "0", there is the condition called "no change". This is equal to (Read * S Carry * P Carry)+(Write * S Carry * P Carry).

(d) The condition known as the "host access error", $H_e$, causes the setting of a flip-flop $34_e$, FIG. 1. (This is also called a block counter error). Thus, the host access error signal or block counter error signal is a result of:

$$H_e = (Read * 6\ BLKFUL) + (Write * 1\ BLKFUL).$$

Thus, on a Read operation, a full RAM buffer (six blocks of data) will signal an error condition.

Likewise, on a Write operation, a single (one) remaining block of data will trigger an error condition.

Figures 5A, 5B:
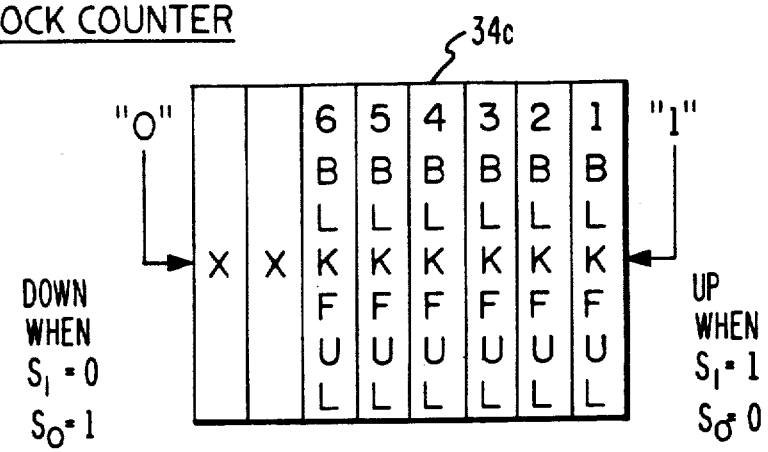
FIG. 5A is a schematic drawing illustrating the significance of each bit-position in the block counter.
FIG. 5B is a chart indicating various "shift" relationships of the block counter with regard to "Read" and "Write" operations.

Referring to FIG. 5A, a schematic drawing of the block counter $34_c$ is shown to indicate that when a "1" resides in a series of bit positions, it is an indication of how many blocks of data reside in the RAM buffer 22 (FIG. 1).

For example, if a "1" resides in each of bit positions 1, 2, 3, 4, this indicates that "4 blocks" of data reside in RAM 22. Each "block" consists of 256 words (512 bytes of eight bits each).

In FIG. 5B the chart illustrates that during "Read" operations:

(a) As the P Carry increases (data being transferred from peripheral tape to buffer memory 22), the block counter $34_c$ will "shift up" indicating the buffer is being "loaded".

(b) As the S Carry increases (data from buffer memory being transferred to main host system), the block counter $34_c$ will "shift down" indicating the buffer memory is being "emptied".

In FIG. 5B the chart illustrates that during "Write" operations:

(c) As S Carry increases (data being loaded in buffer memory from main host system), the block counter $34_c$ will "shift up" to indicate the number of blocks of data in the buffer.

(d) As P Carry increases (data in buffer being unloaded for transfer to peripheral tape unit), the block counter $34_c$ will "shift down" and show how much data is left remaining in buffer 22.

In FIG. 5B, during "Read" operations, when a "1" appears in the 6th bit position of block counter $34_c$, then a flip-flop circuit $34_e$ (FIG. 1) is "set" and provides a signal to the common front end circuit $10_c$ which will inform the main system of an "access-error" condition. This signifies that the buffer memory 22 was "overfilled" in that the main host system did not accept data quickly enough.

During "Write" operations, when the buffer memory 22 has received six blocks of data from the host system, and the 1st bit position (1 BLKFUL) becomes "0", this indicates that the buffer memory has been completely unloaded (cleared) and then the flip-flop $34_e$ is set to signal the common front end circuit $10_c$ that more data is required from the host. This indicates the host did not supply data quickly enough to the RAM buffer 22.

TRANSFER MODE OPERATIONS

The Magnetic Tape-Data Link Processor $20_t$ accomplishes the transfer of data between a peripheral magnetic tape unit and a main host system in two phases. For example, in a "Read" operation, the data is transferred from a selected magnetic tape peripheral unit $50_m$ to the RAM buffer memory 22 in the first phase, then in the second phase it is transferred from RAM buffer memory 22 over to the main host system 10.

Likewise, in a "Write" operation, data is also transferred into two phases, the first phase being the transfer from the main host system to the RAM buffer memory 22 and the second phase being from the RAM buffer memory 22 to the magnetic tape peripheral unit selected, such as $50_{ml}$ of FIG. 2.

The data transfers which occur as between the main host system 10 and the RAM buffer memory 22 (which can occur in either the Read direction or the Write direction) can be made to occur at a rapid rate using a mode which is called a Burst Mode. This can operate up to speeds of 64 megabits per second if the host system is capable of that speed.

Data transfers between the main host system and the RAM buffer memory 22 can also occur in a mode called the "Demand Mode" whereby the data link processor can transfer data at any clock cycle that is available (as long as it is not busy in other housekeeping functions), and will do so at each opportunity to transfer data from the RAM memory 22 over to the main host system 10.

In the "burst mode", however, data is transferred, as between the main host system 10 and the RAM buffer memory 22, in a very fast action whereby a complete unit block of data of 256 words is transferred in one action. Thus, when the distribution card $20_{od}$ has provided a connection between the main host system 10 and the RAM buffer 22, the data link processor $20_t$ can then initiate the burst mode by setting a burst mode flip-flop $36_f$. Prior to this, the burst counter $36_c$ of FIG. 1 is preloaded with a number, n, such as 256. Since 256 words represent one block, this would indicate the counting of one full block of words of data having been transferred when $36_c$ is reduced to a zero count.

The burst counter $36_c$, FIG. 1, is connected to the INRAM bus and output of the S Register so that it can sense the number of words which have been transferred out. When the preloaded count in the burst counter $36_c$ is reduced by 256, the loaded number n will cause a signal to be presented to the flip-flop $36_f$ which can then send a signal (BUFEND/) to the common front end $10_c$ which will cause the end of the burst mode transmission by causing a branch operation in the common front end circuitry.

Thus, this data transfer using a full burst of 256 words occurs both when data is transferred between the host system 10 and the RAM buffer 22, on either a "Read" operation (data from buffer 22 to host 10) or on a "Write" operation (data from host 10 to buffer 22). This burst mode operation, depending on the speed capability of the main host system, can reach up to a data transfer rate of 64 megabits per second.

During the burst mode, the block counter $34_c$ of FIG. 1 is also used to sense the condition of the RAM buffer 22 as to the amount of data residing therein. When less than two blocks of data are left residing in RAM 22 (during the burst mode), then the data link processor $20_t$ calculates the actual length and amount of the remaining data in the buffer 22 by doing a comparison between the P-Register ($P_a$) and the S-Register ($S_a$). At this stage the burst mode of transfer is no longer used and the system goes into a "Demand Mode" form of transfer whereby the remaining number of words are sent to the host system 10 on an individual word basis. The data link processor $20_l$ also determines whether the remaining number of bytes of data is an odd number or an even number. If the number is odd, then the data link processor will "pad" out with zeros in order to make the number of bytes into an "even" number. Then the final two blocks of data are sent to the host system using the "demand mode", whereby the data link processor will transfer data at any available occasion when it is not tied up with other housekeeping functions.

DATA TRANSFERS BETWEEN PERIPHERAL AND BUFFER MEMORY 22

The other phase of the two steps of data transfers between the peripheral and the main host system involves data transfers between the peripheral tape unit $50_m$ and the RAM buffer 22 of the data link processor. Here the "burst mode" is not used but rather data transfer operations occur which are regulated by the tape control unit, TCU $20_{tc}$, shown in FIG. 2. Depending on the tape speed in any selected or individual magnetic tape unit connected to the tape control unit $50_{tc}$, the tape control unit TCU will regulate the data transfer operations which occur as between the peripheral unit and the RAM buffer memory 22. For example, a high speed tape drive which can approach 50 inches per second may cause or permit data transfer operations to occur at the rate of 17 megabits per second as between the buffer memory 22 and the peripheral tape unit.

Referring to FIG. 1, it will be seen that the RAM buffer memory storage means 22 has a data path outward whereby data may be routed either to the main host computer 10 or to the peripheral terminal unit as $50_{m1}$ via tape control unit $50_{tc}$. The output of the S Register in FIG. 1 feeds the input of burst counter $36_c$. This burst counter counts the number of words of data which are being transferred out of the RAM buffer 22.

Since the burst counter $36_c$ is loaded with a preset figure, then when this preset figure is reached, there is an output signal which is provided to flip-flop $36_f$ which can then be used to provide a signal known as BUFEND/ which is a signal to the common front end circuit of the peripheral controller to stop the Burst Mode (STOPB). This signal operates in that it provides a branching operation in the sequencer means of the common front end control circuit $10_c$.

The flip-flop $34_e$ provides an output signal designated BLKERR. This is the block error flag flip-flop signal. A HIGH indicates that the block counter has reached a state indicating "insufficient access" to the host computer in order to maintain the proper data flow.

The flip-flop $36_f$ of FIG. 1 has an output signal designated BUFEND/. This is the buffer end flip-flop signal. A LOW voltage indicates that the Burst Mode must be terminated.

The burst counter $36_c$ has an output designated as the count FF. This goes to a flip-flop called the burst flip-flop and provides a signal called BURSTFF. This signal is the Burst Counter Full flip-flop (BURST=FF). The Burst Counter Full flip-flop is relatched by the signal CLK 8/. A HIGH output indicates that a full buffer has been transferred to the host system 10. This signal is the internal name. The external name of this signal is TEST 10 which is a micro-code branch condition of the common front end CFE $10_c$.

A signal designated BURST Counter Full is a signal which is the carry-out of the most significant counter chip in the burst counter $36_c$. A HIGH signal indicates that a full buffer has been transferred to the host system 10. This signal is also used in a generation of BUFEND/ in order to stop the Burst Mode operations.

As seen in FIG. 1 there is a load signal to the burst counter $36_c$. This is designated LDBURST/ and designates—Load Burst Counter. A LOW voltage signal asynchronously loads the burst counter with data on the least significant byte of the RAM input bus (INRAM).

In FIG. 1 the flip-flop $36_f$ receives an input signal designated AF which is the strobe signal from the host. A HIGH level indicates that the common front end $10_c$ has detected a strobe I/O level from the distribution card $20_{od}$ of FIG. 2. The signal AF/ is the LOW signal which indicates that the CFE $10_c$ has detected a strobe I/O level from the distribution card $20_{od}$. This results from the distribution card receiving a system strobe from the host 10. The system strobe indicates that the host 10 is either transmitting information to the data link processor (peripheral-controller), or that the host 10 is acknowledging receipt of information from the data link processor.

In transfer operations between the peripheral unit and the buffer 22, the tape control unit $50_{tc}$ originates a SEND signal to the peripheral-controller. The SEND/ signal is an interface signal between the peripheral-controller and the tape control unit $50_{tc}$. A LOW voltage indicates that the data link processor is "sending" data to the tape control unit $50_{tc}$. A HIGH indicates that the data link processor is "accepting data from" the tape control unit $50_{tc}$.

On the peripheral dependent board card #1 (designated $80_{p1}$ in FIG. 2) a signal designated STOPB/ is the Burst Mode signal. A HIGH level indicates that the data link processor is in the "Burst Mode". A LOW level of STOPB/ indicates that the Burst Mode should be terminated.

After the data link processor has transmitted one block of data to the tape control unit $50_{tc}$, the data link processor $20_l$ then attempts to "reconnect" back to the host system by means of a "poll request". Once this reconnection is established, the host again transfers additional data to the data link processor using the burst counter at the high speed of burst mode data transfer. This transfer continues until either the 6-blocks of RAM buffer memory 22 are again filled up or until the host 10 provides a "terminate" command signal. It is to be noted that a RAM buffer block which is in the process of being transferred to the peripheral tape control unit $50_{tc}$ is considered as a full buffer unit during this procedure. It may be noted that at the same time that there is data transfer from the host system 10 to the buffer 22, there may also "simultaneously occur" data transfer between the buffer 22 over to the peripheral tape control unit $50_{tc}$.

Another situation occurs in that if the data link processor $20_l$ has not successfully "reconnected" back to the host system 10 before the data link processor has transmitted three blocks of data to the peripheral tape control unit $50_{tc}$, then the data link processor will set the signal "emergency request" on the data link interface of FIG. 1 designated as DLI $20_i$. If this "emergency request" is not successfully serviced before the moment the RAM buffer 22 has only one block of data remaining for transmission to the tape control unit $50_{tc}$, then the block counter $34_c$ of FIG. 1 will cause flip-flop $34_e$ to set a "Block Error" condition which is signalled over to the host system as a "host access error" and placed into the result descriptor. This informs the main host system 10 that the host system has not responded quickly enough to provide more data to the peripheral unit and as a consequence the RAM buffer 22 has been emptied out.

It should be noted that the "last block" of data in the buffer 22, for any given I/O operation, is transferred to the peripheral tape control unit $50_{tc}$ directly under micro-code control of the sequencing means in the common front end CFE $10_c$.

READ OPERATIONS

During a "Read Operation" the data link processor $20_t$ first attempts to connect to the tape control unit peripheral $50_{tc}$. Once a successful connection is accomplished, the data link processor initiates data transfer and begins accepting data from the tape subsystem. This data is transferred into the RAM buffer 22 of FIG. 1.

Once the data link processor $20_t$, via its buffer 22, has received two blocks of data (or has received all the data available if the total length is less than two blocks), the data link processor then attempts to connect to the host system 10 by using a "poll request". The data link processor, via its RAM buffer 22, continues to accept this tape peripheral data while at the same time it is trying to effect a host connection through the distribution card $20_{od}$.

If the host system 10 does not respond to the "poll" request before four blocks of data are presently residing in the RAM buffer 22, then again the data link processor $20_t$ will set an "emergency request" signal on the data link interface $20_i$ (DLI). Now, if no connection to the host system is effectuated before all six RAM buffers are filled, then the data link processor $20_t$ will set flip-flop $34_e$ to indicate the "host access error condition" which will be communicated via a word in the result descriptor data.

Once the main host system 10 answers to a "poll request", then use of the Burst Mode transfer mode is possible again and here the data link processor $20_t$ will load the burst counter $36_c$ and begin to send data to the host system 10 using the burst mode high speed data transfer method. At the same time that this is happening, the RAM buffer 22 continues to receive data from the tape control unit $50_{tc}$.

During these "Read" operations where data is flowing from the peripheral toward the main host system, after the host system 10 has received one block of data, the data link processor $20_t$ will check to see whether or not two full blocks of data remain (in buffer 22) to be transferred to the host. If two full blocks of data remain to be transferred, then the data link processor uses a "break enable" request. If the break enable request is granted, then transmission of the next block of data (data buffer) to the host will continue to occur.

However, if there are less than two full blocks of data in the buffer 22 (or if break enable is refused), then the data link processor $20_t$ disconnects from the host system 10 and will wait for two full blocks of data to be present. If a "break enable" is refused, the data link processor then initiates the "poll request" immediately after disconnection.

However, as regards to the data transfer situation between the RAM buffer 22 and the main host system, this link is capable of handling by the "burst mode" method whereby high speed data transfer can occur up to the limit of capability of the main host system.

As previously discussed, the common front end circuit $10_c$ will cause the loading of the burst counter to indicate the number of words to be transferred in a given burst. When this count is reached, then the burst counter will initiate the BUFEND/ signal which will indicate that the proper number of words have been transferred in the burst mode and that the burst mode can now be stopped.

In the normal situation when there are more than two blocks of data to be transferred from buffer 22 over to the host system 10, the data link processor then loads the burst counter $36_c$ and then sends blocks of data to the host in the "burst mode". But when there are "less than" two blocks of data remaining to complete the I/O operation, the data link processor $20_t$ then calculates the actual length of the remaining data by comparing the P-Register, $P_a$, with the S-Register, $S_a$ (FIG. 1). The common front end $10_c$ of the data link processor then determines whether the remaining number of bytes to be transferred is "odd" or is "even". If there are an "odd" number of bytes, then the final byte is provided as the PAD byte wherein all zeros are inserted by the data link processor.

The final two blocks of data in buffer 22 whether partial or full, are always sent to the host system 10 using the "Demand Mode" wherein the host system must request each word one-by-one before it is transferred from the buffer 22 over to the main host system.

When the data link processor $20_t$ has completed the data transfer, then the tape control unit $50_{tc}$ enters the "result phase" and sends two words of result status to the data link processor $20_t$. The data link processor then incorporates this information, plus any internal result flags, into the final result descriptor words which the data link processor then sends to the host system 10.

During "Write operations", the data is transferred similar to that in "Read" operations except that the data flow is from host 10 to buffer 22 and thence to the peripheral unit. However, transfers of data as between the host 10 and buffer 22 will use the "burst mode" rapid transfer as long as the buffer has at least two full blocks to send or as long as it can receive a full block of data.

What is claimed is:

1. A system for minimizing access errors during data transfer operations between a magnetic tape peripheral unit and a main host computer, wherein a peripheral-controller is initiated by instructions from said main host computer to manage data transfer operations between said host computer and said tape peripheral unit, and wherein said peripheral-controller includes a common front end circuit with a microprocessor unit for sequencing microcode instructions and a peripheral dependent circuit unit for interfacing said magnetic tape peripheral unit, the combination comprising:

(a) common control circuit means including:
  (a1) microprocessor unit means for executing data transfer instructions in accord with commands received from said host computer, and including:
    (a1a) sensing means, connected to a memory status logic means in said peripheral dependent circuit unit, to receive status signals representing the number of blocks of data residing in a RAM buffer memory means;

(a1b) means for executing data transfers in a burst mode or a demand mode according to the said status signals, said burst mode operating to transfer a block of N words per one instruction without interrupting said microprocessor unit means, and said demand mode operating to transfer individual bytes of one word for each instruction from said microprocessor unit means;

(a1c) whereby said access errors are minimized by allocating sufficient time for transferring blocks of N words without interrupting the microprocessor in the burst mode and by allocating sufficient time for transferring individual bytes of a word in the demand mode means for addressing word storage areas of a RAM buffer memory means;

(a2) RAM buffer memory means having data bus connections to said host computer and also to said tape peripheral unit, said memory means including:

(a2a) multiple storage areas, each storage area providing a block of N words;

(b) said peripheral dependent circuit unit connected to said common control circuit means and including:

(b1) said memory status logic means for receiving address data to count words entering or leaving said RAM buffer memory means and including:

(b1a) count logic means to maintain a count of the number of data blocks residing in said RAM buffer memory means, said count logic means providing a memory status signal to said microprocessor unit sensing means;

(c) and wherein said microprocessor unit means will initiate burst mode data transfer operations from said RAM buffer memory means to said host computer only when at least $B_x$ full data blocks reside in said RAM buffer memory means awaiting transfer to said host computer, where $B_x$ is an integer equal to 2 or greater.

2. The system of claim 1, wherein said microprocessor means includes:

(a) means to execute a burst mode data transfer operation during a Write operation from host computer to said buffer memory means when said status condition signal indicates at least four empty block-size areas in said buffer memory means.

3. The system of claim 2, wherein said block counter means includes:

(a) means to count the number of blocks of data transferred from said host computer to said buffer means during a Write operation;

(b) means to generate a disconnect op signal to said microprocessor to cause said microprocessor to disconnect the said connection channel between said host computer and said buffer memory means, said disconnect op signal being generated when said buffer memory means has received $B_x$ blocks of data from said host computer.

4. The system of claim 3, wherein said block counter means includes:

(a) means to send a status condition signal to said microprocessor means during a Write operation to indicate at least one empty block-size area in said buffer memory means, said status condition signal causing said microprocessor means to attempt re-connection of said connection channel to said host computer for further data block transfer.

5. The system of claim 1, wherein said logic sensing means includes:

(a) access error signal means, controlled by said block counter means, for generating a block access error signal to said microprocessor means when said host computer has not supplied data, on a Write operation, rapidly enough, to said buffer memory means, to keep at least one full block of data in said buffer memory means.

6. The system of claim 1, wherein said logic sensing means includes:

(a) access error signal means, controlled by said block counter means, during a Read operation, for generating a block access error signal to said microprocessor means when the said status conditional signal represents a number greater than $B_x$ which indicates the buffer memory was overfilled and data transferred from the tape peripheral unit was lost.

7. The system of claim 1, wherein said logic sensing means includes:

(a) a first peripheral address register means connected to said microprocessor means for controlling said block counter means to count up during Write operations between said host computer and said buffer memory means and to count down during Write operations between said buffer memory means and said tape peripheral;

(b) and further operating, during Read operations, to count up on data block transfers to said tape peripheral unit from said buffer memory means, and to count down during data block transfer from said buffer memory means to said host computer.

8. The combination of claim 1 wherein:

(a) said microprocessor unit means will initiate burst mode data transfer operations from said RAM buffer memory means to said tape peripheral unit only when at least $B_x$ full data blocks reside in said RAM buffer memory means awaiting transfer to said tape peripheral unit, and $B_x$ is an integer equal to 2 or greater.

* * * * *

UNITED STATES PATENT AND TRADEMARK OFFICE
CERTIFICATE OF CORRECTION

PATENT NO. : 4,542,457

DATED : September 17, 1985

INVENTOR(S) : David J. Mortensen and Jayesh V. Sheth

It is certified that error appears in the above-identified patent and that said Letters Patent is hereby corrected as shown below:

Col. 9, line 3, change "S Carry" to --$\overline{\text{S Carry}}$--;

line 4, change "P Carry)." to --$\overline{\text{P Carry}}$).--;

line 8, change "P Carry)" to --$\overline{\text{P Carry}}$)--;

change "S Carry" to --$\overline{\text{S Carry}}$--;

line 18, change "1 BLKFUL)." to --$\overline{\text{1 BLKFUL}}$).--.

Signed and Sealed this

Fourth Day of February 1986

[SEAL]

Attest:

DONALD J. QUIGG

Attesting Officer

Commissioner of Patents and Trademarks